United States Patent
Khlat (10) Patent No.: US 10,080,190 B2
(45) Date of Patent: Sep. 18, 2018

(54) MULTI-BAND ENVELOPE TRACKING CIRCUIT

(71) Applicant: Qorvo US, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 120 days.

(21) Appl. No.: 15/194,839

(22) Filed: Jun. 28, 2016

(65) Prior Publication Data

US 2017/0171813 A1    Jun. 15, 2017

Related U.S. Application Data

(60) Provisional application No. 62/265,221, filed on Dec. 9, 2015.

(51) Int. Cl.
*H04W 52/02*    (2009.01)
*H04W 24/08*    (2009.01)

(52) U.S. Cl.
CPC ....... *H04W 52/0212* (2013.01); *H04W 24/08* (2013.01)

(58) Field of Classification Search
None
See application file for complete search history.

(56) References Cited

U.S. PATENT DOCUMENTS

| 2013/0207731 A1* | 8/2013 | Balteanu | H03F 1/02 330/296 |
|---|---|---|---|
| 2016/0079934 A1* | 3/2016 | Ichitsubo | H04B 1/0067 330/251 |
| 2016/0173031 A1* | 6/2016 | Langer | H03F 1/0205 330/126 |
| 2017/0026925 A1* | 1/2017 | Kim | H04W 56/0015 |

* cited by examiner

*Primary Examiner* — Robert C. Scheibel
(74) *Attorney, Agent, or Firm* — Withrow & Terranova, P.L.L.C.

(57) ABSTRACT

A multi-band envelope tracking circuit is disclosed. The multi-band envelope tracking circuit includes a first radio frequency (RF) transceiver and a second RF transceiver, each configured to communicate one or more RF signals in one or more RF bands, and an envelope tracking signal corresponding to the one or more RF signals. The multi-band envelope tracking circuit includes a first envelope tracking signal path and a second envelope tracking signal path, each configured to amplify RF signal(s) in RF band(s) based on corresponding envelope tracking signal(s). Switching circuitry is provided and configured to provide the corresponding envelope tracking signal(s) to selected one or more of the first envelope tracking signal path and the second envelope tracking signal path. As such, the multi-band envelope tracking circuit can perform envelope tracking power amplification in various RF band combinations, thus supporting multi-band wireless communications with reduced power consumption and heat dissipation.

20 Claims, 8 Drawing Sheets

MULTI-BAND ENVELOPE TRACKING CIRCUIT

RELATED APPLICATIONS

This application claims the benefit of U.S. Provisional Patent Application Ser. No. 62/265,221, filed Dec. 9, 2015, which is incorporated herein by reference in its entirety.

FIELD OF THE DISCLOSURE

The technology of the disclosure relates generally to multi-band wireless communication.

BACKGROUND

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rate offered by wireless communication technologies, such as long-term evolution (LTE). To achieve the higher data rate in mobile communication devices, sophisticated radio frequency (RF) power amplifiers (PAs) may be employed to increase average output power of RF signals (e.g., maintaining sufficient energy per bit) communicated by mobile communication devices. However, the increased average output power of RF signals can lead to increased power consumption and thermal dissipation in mobile communication devices, thus compromising overall performance and user experiences.

Envelope tracking is a power management technology designed to improve efficiency levels of the RF PAs to help reduce power consumption and thermal dissipation in mobile communication devices. As the name suggests, envelope tracking employs a system that keeps track of the amplitude envelope of the RF signals communicated by mobile communication devices. Accordingly, power supply voltage applied to the RF PAs may be constantly adjusted to ensure that the RF PAs are operating at a higher efficiency for a given instantaneous output power requirement of the RF signals. In this regard, envelope tracking will not operate properly without the amplitude envelope tracking information of the RF signals.

SUMMARY

Aspects disclosed in the detailed description include a multi-band envelope tracking circuit. In this regard, the multi-band envelope tracking circuit includes a first radio frequency (RF) transceiver and a second RF transceiver, each configured to communicate one or more RF signals in one or more RF bands, and an envelope tracking signal corresponding to the one or more RF signals. The multi-band envelope tracking circuit includes a first envelope tracking signal path and a second envelope tracking signal path, each configured to amplify RF signal(s) in RF band(s) based on corresponding envelope tracking signal(s). Switching circuitry is provided and configured to provide the corresponding envelope tracking signal(s) to selected one or more of the first envelope tracking signal path and the second envelope tracking signal path. As such, the multi-band envelope tracking circuit can perform envelope tracking power amplification in various RF band combinations, thus supporting multi-band wireless communications (e.g., uplink carrier aggregation) with reduced power consumption and heat dissipation.

In this regard, in one aspect, a multi-band envelope tracking circuit is provided. The multi-band envelope tracking circuit comprises a first RF transceiver configured to communicate a first RF signal in a first RF band and a second RF signal in a second RF band. The multi-band envelope tracking circuit also comprises a second RF transceiver configured to communicate a third RF signal in a third RF band and a fourth RF signal in a fourth RF band. The multi-band envelope tracking circuit also comprises a first envelope tracking signal path. The first envelope tracking signal path is configured to amplify the first RF signal in the first RF band based on at least one first envelope tracking signal. The first envelope tracking signal path is also configured to amplify the fourth RF signal in the fourth RF band based on at least one second envelope tracking signal. The multi-band envelope tracking circuit also comprises a second envelope tracking signal path. The second envelope tracking signal path is configured to amplify the second RF signal in the second RF band based on the at least one first envelope tracking signal. The second envelope tracking signal path is also configured to amplify the third RF signal in the third RF band based on the at least one second envelope tracking signal. The multi-band envelope tracking circuit also comprises switching circuitry. The switching circuitry is configured to receive the at least one first envelope tracking signal and the at least one second envelope tracking signal from the first RF transceiver and the second RF transceiver, respectively. The switching circuitry is also configured to provide one or more of the at least one first envelope tracking signal and the at least one second envelope tracking signal to selected one or more of the first envelope tracking signal path and the second envelope tracking signal path.

In another aspect, a multi-band envelope tracking circuit is provided. The multi-band envelope tracking circuit comprises a first RF transceiver configured to communicate at least one first RF communication signal in one or more first RF communication bands. The multi-band envelope tracking circuit also comprises a second RF transceiver configured to communicate at least one second RF communication signal in one or more second RF communication bands. The multi-band envelope tracking circuit also comprises a first envelope tracking signal path. The first envelope tracking signal path is configured to amplify the at least one first RF communication signal in at least one of the one or more first RF communication bands based on at least one first envelope tracking signal. The first envelope tracking signal path is also configured to amplify the at least one second RF communication signal in at least one of the one or more second RF communication bands based on at least one second envelope tracking signal. The multi-band envelope tracking circuit also comprises a second envelope tracking signal path. The second envelope tracking signal path is configured to amplify the at least one first RF communication signal in the at least one of the one or more first RF communication bands based on the at least one first envelope tracking signal. The second envelope tracking signal path is also configured to amplify the at least one second RF communication signal in the at least one of the one or more second RF communication bands based on the at least one second envelope tracking signal. The multi-band envelope tracking circuit also comprises switching circuitry. The switching circuitry is configured to receive the at least one first envelope tracking signal and the at least one second envelope tracking signal from the first RF transceiver and the second RF transceiver, respectively. The switching circuitry is also configured to provide one or more of the at least one first envelope tracking signal and the at least one second envelope tracking signal to selected one or more of the first envelope tracking signal path and the second envelope tracking signal path.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Aspects disclosed in the detailed description include a multi-band envelope tracking circuit. In this regard, the multi-band envelope tracking circuit includes a first radio frequency (RF) transceiver and a second RF transceiver, each configured to communicate one or more RF signals in one or more RF bands, and an envelope tracking signal corresponding to the one or more RF signals. The multi-band envelope tracking circuit includes a first envelope tracking signal path and a second envelope tracking signal path, each configured to amplify RF signal(s) in RF band(s) based on corresponding envelope tracking signal(s). Switching circuitry is provided and configured to provide the corresponding envelope tracking signal(s) to selected one or more of the first envelope tracking signal path and the second envelope tracking signal path. As such, the multi-band envelope tracking circuit can perform envelope tracking power amplification in various RF band combinations, thus supporting multi-band wireless communications (e.g., uplink carrier aggregation) with reduced power consumption and heat dissipation.

Figure 1A:
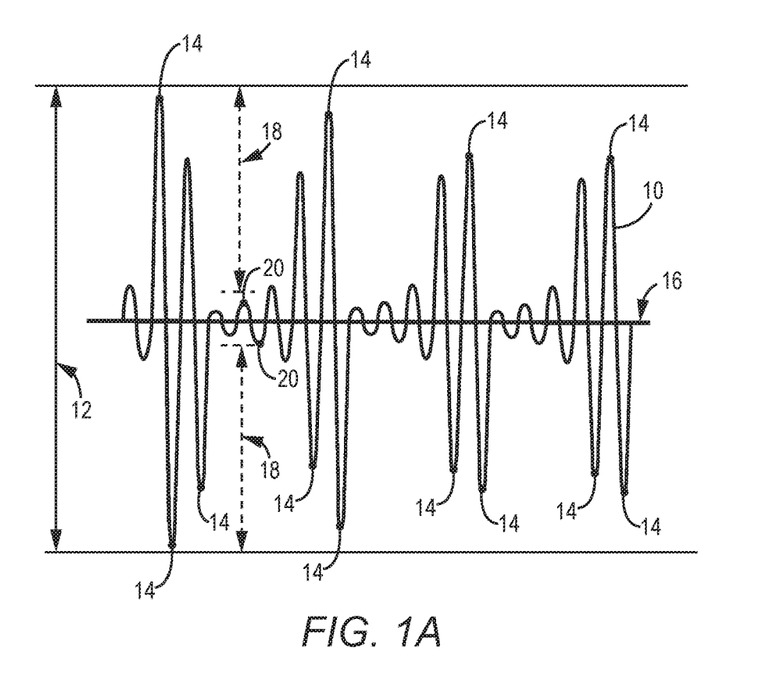
FIG. 1A is a schematic diagram of an exemplary amplitude-modulated radio frequency (RF) signal configured to be amplified based on a uniform supply voltage.
Figure 1B:
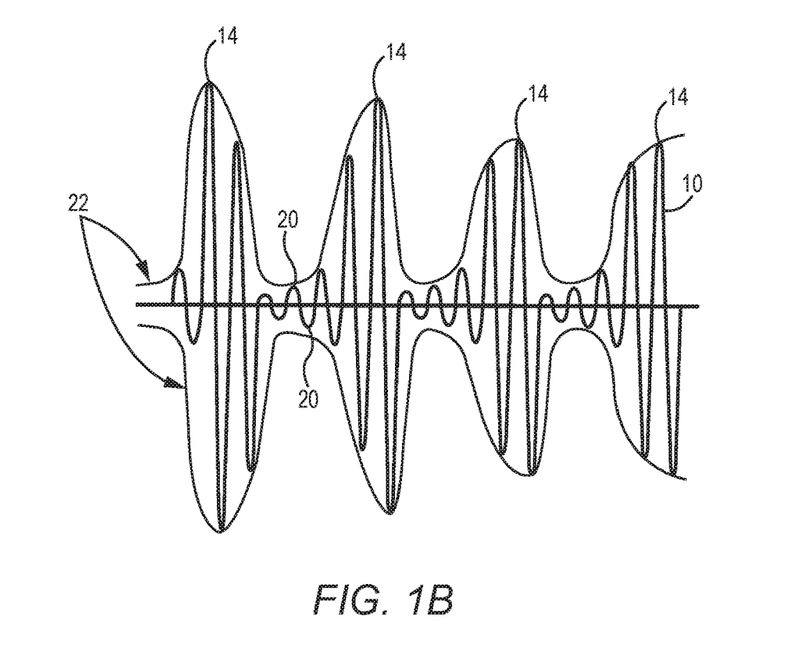
FIG. 1B is a schematic diagram of the amplitude-modulated RF signal of FIG. 1A configured to be amplified based on an envelope tracking supply voltage.

Before discussing the wireless charging concepts of the present disclosure, a brief overview of using envelope tracking to reduce power consumption when amplifying an amplitude-modulated RF signal is first provided with reference to FIGS. 1A and 1B. A conventional envelope tracking circuit that enables envelope tracking is then discussed with reference to FIG. 2. The discussion of specific exemplary aspects of a multi-band envelope tracking circuit starts below with reference to FIG. 3.

In this regard, FIG. 1A is a schematic diagram of an exemplary amplitude-modulated RF signal 10 configured to be amplified based on a uniform supply voltage 12. In a non-limiting example, wireless communication systems (not shown), such as long-term evolution (LTE) communication system for example, use amplitude modulation techniques (e.g., quadrature amplitude modulation (QAM)) to modulate data onto the amplitude-modulated RF signal 10. The amplitude-modulated RF signal 10 is subsequently amplified to a desired power level by an RF amplifier (not shown) before being communicated via a wireless communication medium (e.g., an RF band). The RF amplifier is configured to amplify the amplitude-modulated RF signal 10 to the desired power level based on the uniform supply voltage 12.

However, amplitude modulation techniques can generate peak points 14, relative to an average point 16, in the amplitude-modulated RF signal 10. In this regard, the uniform supply voltage 12 is required to be high enough to deliver the desired power level at the peak points 14. As a result, a surplus supply voltage 18 may result at valley points 20 of the amplitude-modulated RF signal 10. The surplus supply voltage 18 not only causes unnecessary power consumption, but also generates additional heat in the wireless communication systems. Envelope tracking is a power management technology that can help reduce the surplus supply voltage 18 when amplifying the amplitude-modulated RF signal 10.

In this regard, FIG. 1B is a schematic diagram of the amplitude-modulated RF signal 10 of FIG. 1A configured to be amplified based on an envelope tracking supply voltage 22. According to FIG. 1B, the envelope tracking supply voltage 22 increases at the peak points 14 of the amplitude-modulated RF signal 10 and decreases at the valley points 20 of the amplitude-modulated RF signal 10. As such, the surplus supply voltage 18 may be reduced.

Figure 2:
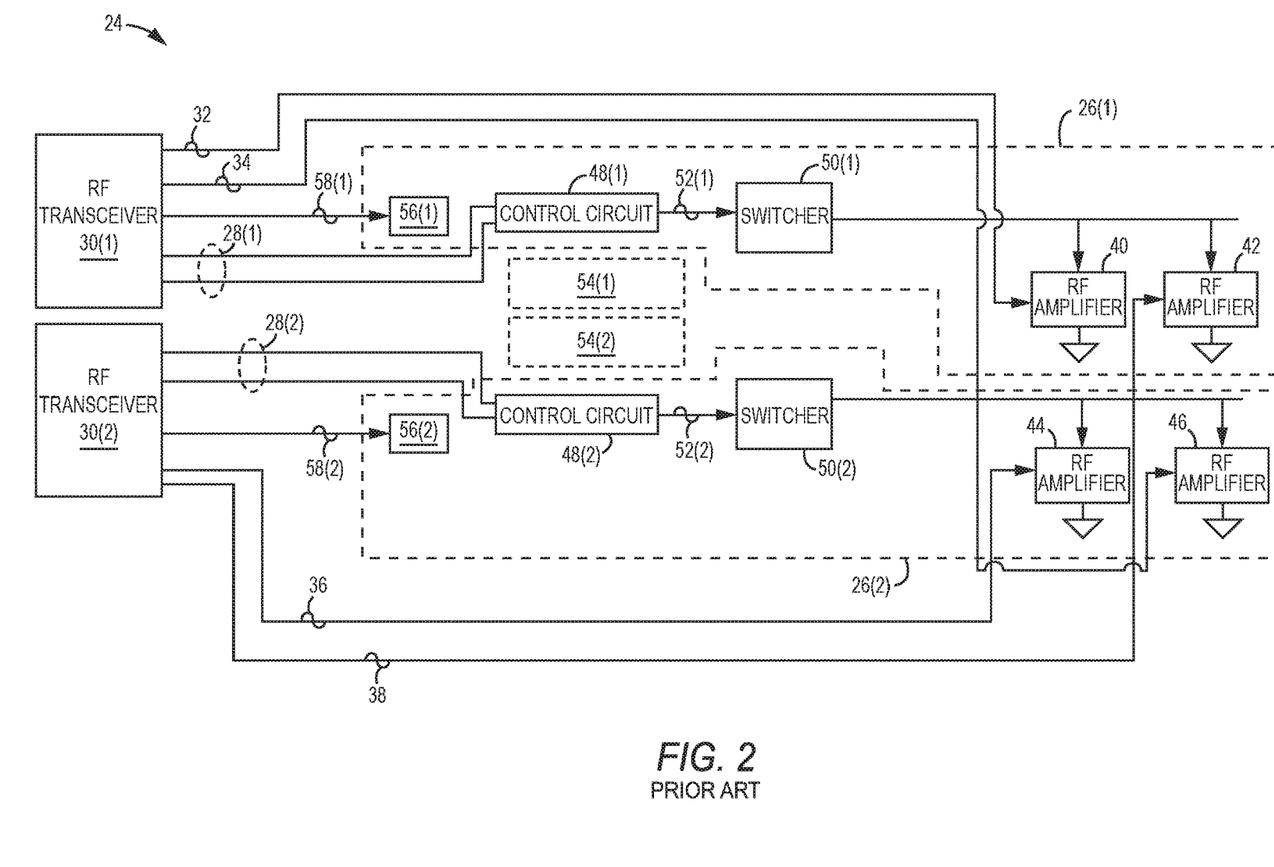
FIG. 2 is a schematic diagram of an exemplary conventional envelope tracking circuit configured to control a first envelope tracking signal path and a second envelope tracking signal path with a first envelope tracking signal and a second envelope tracking signal, respectively.

To be able to provide the envelope tracking supply voltage 22, it is necessary to track the peak points 14 and the valley points 20 in the amplitude-modulated RF signal 10. In this regard, FIG. 2 is a schematic diagram of an exemplary conventional envelope tracking circuit 24 configured to control a first envelope tracking signal path 26(1) and a second envelope tracking signal path 26(2) with a first envelope tracking signal 28(1) and a second envelope tracking signal 28(2), respectively.

The conventional envelope tracking circuit 24 includes a first RF transceiver 30(1) and a second RF transceiver 30(2). The first RF transceiver 30(1) is configured to communicate a first RF signal 32 in a first RF band and a second RF signal 34 in a second RF band. The second RF transceiver 30(2) is configured to communicate a third RF signal 36 in a third RF band and a fourth RF signal 38 in a fourth RF band. In a non-limiting example, the first RF signal 32, the second RF signal 34, the third RF signal 36, and the fourth RF signal 38 are amplitude-modulated RF signals having the peak points 14 and the valley points 20 of FIG. 1A. In another non-limiting example, the first RF signal 32, the second RF signal 34, the third RF signal 36, and the fourth RF signal 38 are LTE signals. Accordingly, the first RF band may be in the 700 megahertz (MHz) RF spectrum, the second RF band may be in the 1900 MHz RF spectrum, the third RF band may be in the 1700 MHz RF spectrum, and the fourth RF band may be in the 850 MHz RF spectrum.

The first envelope tracking signal path 26(1) includes a first lower-band RF amplifier 40 and a first higher-band RF amplifier 42. The first lower-band RF amplifier 40 is configured to amplify the first RF signal 32 in the first RF band (e.g., 700 MHz). The first higher-band RF amplifier 42 is configured to amplify the fourth RF signal 38 in the fourth RF band (e.g., 850 MHz). The second envelope tracking signal path 26(2) includes a second lower-band RF amplifier 44 and a second higher-band RF amplifier 46. The second lower-band RF amplifier 44 is configured to amplify the third RF signal 36 in the third RF band (e.g., 1700 MHz). The second higher-band RF amplifier 46 is configured to amplify the second RF signal 34 in the second RF band (e.g., 1900 MHz).

The first envelope tracking signal 28(1), which may be a differential signal, is configured to keep track of the peak points 14 and the valley points 20 of FIG. 1A in the first RF signal 32 and the second RF signal 34. Likewise, the second envelope tracking signal 28(2), which may be a differential signal as well, is configured to keep track of the peak points 14 and the valley points 20 in the third RF signal 36 and the fourth RF signal 38.

The first envelope tracking signal path 26(1) includes a first control circuit 48(1) and a first switcher 50(1). The first control circuit 48(1) is configured to receive the first envelope tracking signal 28(1) from the first RF transceiver 30(1). The first control circuit 48(1) may generate a first envelope tracking voltage supply signal 52(1) based on the first envelope tracking signal 28(1). The first switcher 50(1) receives the first envelope tracking voltage supply signal 52(1) and provides the envelope tracking supply voltage 22 of FIG. 1B to the first lower-band RF amplifier 40 and/or the first higher-band RF amplifier 42.

The second envelope tracking signal path 26(2) includes a second control circuit 48(2) and a second switcher 50(2). The second control circuit 48(2) is configured to receive the second envelope tracking signal 28(2) from the second RF transceiver 30(2). The second control circuit 48(2) may generate a second envelope tracking voltage supply signal 52(2) based on the second envelope tracking signal 28(2). The second switcher 50(2) receives the second envelope tracking voltage supply signal 52(2) and provides the envelope tracking supply voltage 22 of FIG. 1B to the second lower-band RF amplifier 44 and/or the second higher-band RF amplifier 46.

The first higher-band RF amplifier 42 is configured to amplify the fourth RF signal 38 provided by the second RF transceiver 30(2). However, the first higher-band RF amplifier 42 is controlled by the first switcher 50(1) based on the first envelope tracking signal 28(1). According to discussions above, the first envelope tracking signal 28(1) is generated by the first RF transceiver 30(1) to track the peak points 14 and the valley points 20 in the first RF signal 32 and/or the second RF signal 34. In this regard, the first envelope tracking signal 28(1) does not track the peak points 14 and the valley points 20 in the fourth RF signal 38. Therefore, the first higher-band RF amplifier 42 is unable to amplify the fourth RF signal 38 based on the first envelope tracking signal 28(1).

Likewise, the second higher-band RF amplifier 46 is configured to amplify the second RF signal 34 provided by the first RF transceiver 30(1). However, the second higher-band RF amplifier 46 is controlled by the second switcher 50(2) based on the second envelope tracking signal 28(2). According to discussions above, the second envelope tracking signal 28(2) is generated by the second RF transceiver 30(2) to track the peak points 14 and the valley points 20 in the third RF signal 36 and/or the fourth RF signal 38. In this regard, the second envelope tracking signal 28(2) does not track the peak points 14 and the valley points 20 in the second RF signal 34. Therefore, the second higher-band RF amplifier 46 is unable to amplify the second RF signal 34 based on the second envelope tracking signal 28(2).

The first RF transceiver 30(1) and/or the second RF transceiver 30(2) may be configured to support uplink carrier aggregation. In this regard, the first RF transceiver 30(1) may be configured to transmit the first RF signal 32 and the second RF signal 34 concurrently. Likewise, the second RF transceiver 30(2) may be configured to transmit the third RF signal 36 and the fourth RF signal 38 concurrently. As discussed above, the first envelope tracking signal path 26(1) is unable to amplify the fourth RF signal 38, and the second envelope tracking signal path 26(2) is unable to amplify the second RF signal 34. Therefore, it is necessary to amplify the second RF signal 34 and the fourth RF signal 38 via alternative power amplification mechanisms.

As such, the conventional envelope tracking circuit 24 includes a first average power tracking (APT) circuit 54(1) and a second APT circuit 54(2). In a non-limiting example, the first APT circuit 54(1) is communicatively coupled to the first higher-band RF amplifier 42, and the second APT circuit 54(2) is communicatively coupled to the second higher-band RF amplifier 46. In this regard, to configure the first RF transceiver 30(1) to support uplink carrier aggregation, the conventional envelope tracking circuit 24 may be configured to amplify the first RF signal 32 via the first envelope tracking signal path 26(1) and amplify the second RF signal 34 via the second APT circuit 54(2). As a result, the first RF transceiver 30(1) may be configured to transmit the first RF signal 32 and the second RF signal 34 concurrently. Likewise, to configure the second RF transceiver 30(2) to support uplink carrier aggregation, the conventional envelope tracking circuit 24 may be configured to amplify the third RF signal 36 via the second envelope tracking signal path 26(2) and amplify the fourth RF signal 38 via the first APT circuit 54(1). As a result, the second RF transceiver 30(2) may be configured to transmit the third RF signal 36 and the fourth RF signal 38 concurrently.

The conventional envelope tracking circuit 24 also includes a first configuration circuit 56(1) and a second configuration circuit 56(2). The first configuration circuit 56(1) may configure the first envelope tracking signal path 26(1) and the second APT circuit 54(2) to amplify the first RF signal 32 and the second RF signal 34, respectively, based on a first configuration signal 58(1) received from the first RF transceiver 30(1). Likewise, the second configuration circuit 56(2) may configure the second envelope tracking signal path 26(2) and the first APT circuit 54(1) to amplify the third RF signal 36 and the fourth RF signal 38, respectively, based on a second configuration signal 58(2) received from the second RF transceiver 30(2).

The conventional envelope tracking circuit 24 may be configured to support uplink carrier aggregation based on a combination of the first envelope tracking signal path 26(1) and the second APT circuit 54(2) or a combination of the second envelope tracking signal path 26(2) and the first APT circuit 54(1). However, the first APT circuit 54(1) and the second APT circuit 54(2) may be less efficient in reducing the surplus supply voltage 18 of FIG. 1A, compared to the first envelope tracking signal path 26(1) and the second envelope tracking signal path 26(2). As such, it may be desirable to configure the first envelope tracking signal path 26(1) to amplify the fourth RF signal 38 based on the second envelope tracking signal 28(2). Likewise, it may also be desirable to configure the second envelope tracking signal path 26(2) to amplify the second RF signal 34 based on the first envelope tracking signal 28(1).

Figure 3:
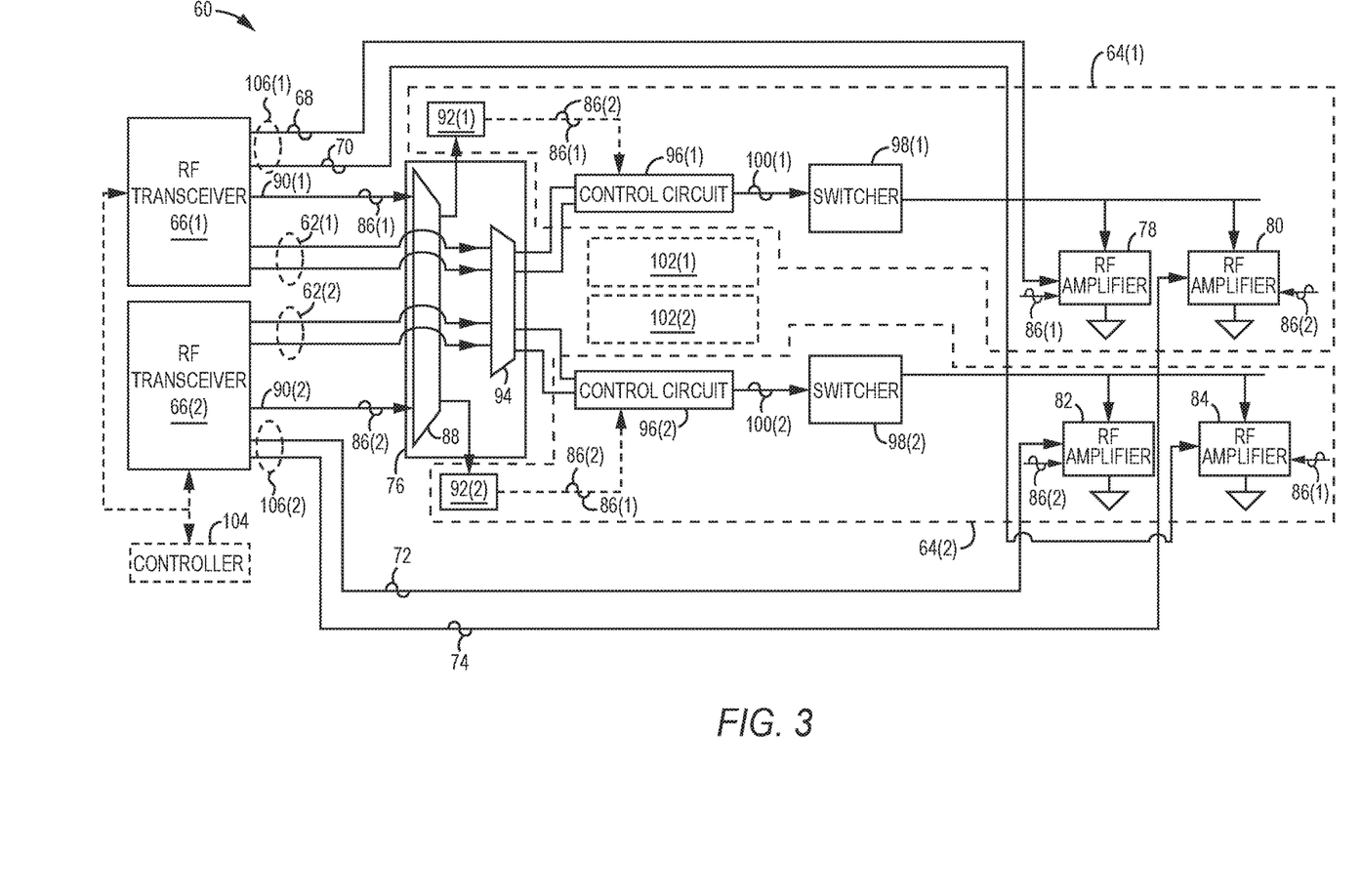
FIG. 3 is a schematic diagram of an exemplary multi-band envelope tracking circuit in which at least one first envelope tracking signal and at least one second envelope tracking signal can be selectively provided to a first envelope tracking signal path and a second envelope tracking signal path in the multi-band envelope tracking circuit.

In this regard, FIG. 3 is a schematic diagram of an exemplary multi-band envelope tracking circuit 60 in which at least one first envelope tracking signal 62(1) and at least one second envelope tracking signal 62(2) can be selectively provided to a first envelope tracking signal path 64(1) and a second envelope tracking signal path 64(2) in the multi-band envelope tracking circuit 60. The multi-band envelope tracking circuit 60 includes a first RF transceiver 66(1) and a second RF transceiver 66(2). The first RF transceiver 66(1) is configured to communicate a first RF signal 68 in a first RF band and a second RF signal 70 in a second RF band. The second RF transceiver 66(2) is configured to communicate a third RF signal 72 in a third RF band and a fourth RF signal 74 in a fourth RF band.

In a non-limiting example, the first RF signal 68, the second RF signal 70, the third RF signal 72, and the fourth RF signal 74 are LTE signals. Accordingly, the first RF band may be in the 700 MHz RF spectrum, the second RF band may be in the 1900 MHz RF spectrum, the third RF band may be in the 1700 MHz RF spectrum, and the fourth RF band may be in the 850 MHz RF spectrum.

In another non-limiting example, the first RF signal 68, the second RF signal 70, the third RF signal 72, and the fourth RF signal 74 are amplitude-modulated RF signals having the peak points 14 and the valley points 20 of FIG. 1A. In this regard, the first RF transceiver 66(1) generates the first envelope tracking signal 62(1) to track the peak points 14 and the valley points 20 in the first RF signal 68 and the second RF signal 70. Similarly, the second RF transceiver 66(2) generates the second envelope tracking signal 62(2) to track the peak points 14 and the valley points 20 in the third RF signal 72 and the fourth RF signal 74.

The multi-band envelope tracking circuit 60 includes switching circuitry 76 communicatively coupled to the first RF transceiver 66(1) and the second RF transceiver 66(2). The switching circuitry 76 is configured to receive the first envelope tracking signal 62(1) and the second envelope tracking signal 62(2) from the first RF transceiver 66(1) and the second RF transceiver 66(2), respectively. The switching circuitry 76 is further configured to provide one or more of the first envelope tracking signal 62(1) and the second envelope tracking signal 62(2) to selected one or more of the first envelope tracking signal path 64(1) and the second envelope tracking signal path 64(2), as illustrated and discussed with reference to FIGS. 4A-4D below. Common elements between FIGS. 3 and 4A-4D are shown therein with common element numbers and will not be re-described herein.

Figure 4A:
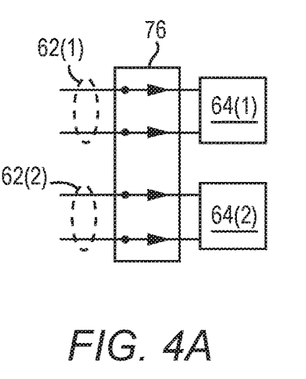
FIG. 4A is a schematic diagram of a switching circuitry configured to provide one or more of the at least one first envelope tracking signal and the at least one second envelope tracking signal of FIG. 3 to selected one or more of the first envelope tracking signal path and the second envelope tracking signal path according to a first multiplexing configuration.

In this regard, FIG. 4A is a schematic diagram of the switching circuitry 76 of FIG. 3 configured to provide one or more of the first envelope tracking signal 62(1) and the second envelope tracking signal 62(2) to selected one or more of the first envelope tracking signal path 64(1) and the second envelope tracking signal path 64(2) according to a first multiplexing configuration. As illustrated in FIG. 4A, the switching circuitry 76 is configured to provide the first envelope tracking signal 62(1) and the second envelope tracking signal 62(2) to the first envelope tracking signal path 64(1) and the second envelope tracking signal path 64(2), respectively.

Figure 4B:
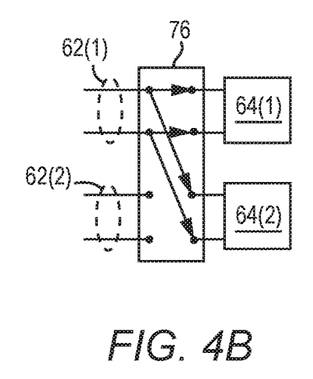
FIG. 4B is a schematic diagram of a switching circuitry configured to provide one or more of the at least one first envelope tracking signal and the at least one second envelope tracking signal of FIG. 3 to selected one or more of the first envelope tracking signal path and the second envelope tracking signal path according to a second multiplexing configuration.

FIG. 4B is a schematic diagram of the switching circuitry 76 of FIG. 3 configured to provide one or more of the first envelope tracking signal 62(1) and the second envelope tracking signal 62(2) to selected one or more of the first envelope tracking signal path 64(1) and the second envelope tracking signal path 64(2) according to a second multiplexing configuration. As illustrated in FIG. 4B, the switching circuitry 76 is configured to provide the first envelope tracking signal 62(1) to the first envelope tracking signal path 64(1) and the second envelope tracking signal path 64(2).

Figure 4C:
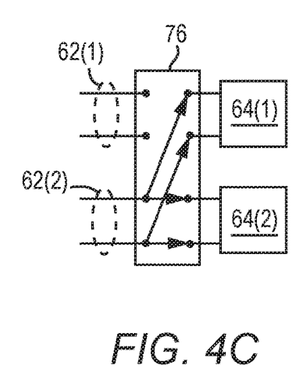
FIG. 4C is a schematic diagram of a switching circuitry configured to provide one or more of the at least one first envelope tracking signal and the at least one second envelope tracking signal of FIG. 3 to selected one or more of the first envelope tracking signal path and the second envelope tracking signal path according to a third multiplexing configuration.

FIG. 4C is a schematic diagram of the switching circuitry 76 of FIG. 3 configured to provide one or more of the first envelope tracking signal 62(1) and the second envelope tracking signal 62(2) to selected one or more of the first envelope tracking signal path 64(1) and the second envelope tracking signal path 64(2) according to a third multiplexing configuration. As illustrated in FIG. 4C, the switching circuitry 76 is configured to provide the second envelope tracking signal 62(2) to the first envelope tracking signal path 64(1) and the second envelope tracking signal path 64(2).

Figure 4D:
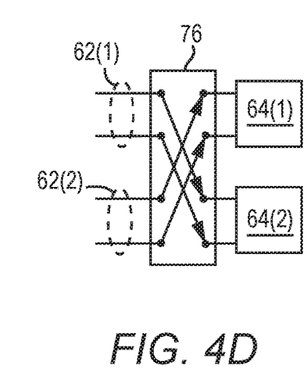
FIG. 4D is a schematic diagram of a switching circuitry configured to provide one or more of the at least one first envelope tracking signal and the at least one second envelope tracking signal of FIG. 3 to selected one or more of the first envelope tracking signal path and the second envelope tracking signal path according to a fourth multiplexing configuration.

FIG. 4D is a schematic diagram of the switching circuitry 76 of FIG. 3 configured to provide one or more of the first envelope tracking signal 62(1) and the second envelope tracking signal 62(2) to selected one or more of the first envelope tracking signal path 64(1) and the second envelope tracking signal path 64(2) according to a fourth multiplexing configuration. As illustrated in FIG. 4D, the switching circuitry 76 is configured to provide the first envelope tracking signal 62(1) to the second envelope tracking signal path 64(2), and provide the second envelope tracking signal 62(2) to the first envelope tracking signal path 64(1).

With reference back to FIG. 3, the first envelope tracking signal path 64(1) includes a first lower-band RF amplifier 78 and a first higher-band RF amplifier 80. The first lower-band RF amplifier 78 is configured to amplify the first RF signal 68, which is received from the first RF transceiver 66(1), in the first RF band (e.g., 700 MHz). The first higher-band RF amplifier 80 is configured to amplify the fourth RF signal 74, which is received from the second RF transceiver 66(2), in the fourth RF band (e.g., 850 MHz). The second envelope tracking signal path 64(2) includes a second lower-band RF amplifier 82 and a second higher-band RF amplifier 84. The second lower-band RF amplifier 82 is configured to amplify the third RF signal 72, which is received from the second RF transceiver 66(2), in the third RF band (e.g., 1700 MHz). The second higher-band RF amplifier 84 is configured to amplify the second RF signal 70, which is received from the first RF transceiver 66(1), in the second RF band (e.g., 1900 MHz).

The first envelope tracking signal 62(1), which may be a differential signal, is configured to keep track of the peak points 14 and the valley points 20 of FIG. 1A in the first RF signal 68 and the second RF signal 70. Likewise, the second envelope tracking signal 62(2), which may be a differential signal as well, is configured to keep track of the peak points 14 and the valley points 20 in the third RF signal 72 and the fourth RF signal 74.

In this regard, according to the first multiplexing configuration of FIG. 4A, the multi-band envelope tracking circuit 60 can be configured to concurrently amplify the first RF signal 68 in the first RF band and the third RF signal 72 in the third RF band based on the first envelope tracking signal 62(1) and the second envelope tracking signal 62(2), respectively. Likewise, according to the second multiplexing configuration of FIG. 4B, the multi-band envelope tracking circuit 60 can be configured to concurrently amplify the first RF signal 68 in the first RF band and the second RF signal 70 in the second RF band based on the first envelope tracking signal 62(1). Accordingly, according to the third multiplexing configuration of FIG. 4C, the multi-band envelope tracking circuit 60 can be configured to concurrently amplify the third RF signal 72 in the third RF band and the fourth RF signal 74 in the fourth RF band based on the second envelope tracking signal 62(2). Further, according to the fourth multiplexing configuration of FIG. 4D, the multi-band envelope tracking circuit 60 can be configured to concurrently amplify the second RF signal 70 in the second RF band and the fourth RF signal 74 in the fourth RF band based on the first envelope tracking signal 62(1) and the second envelope tracking signal 62(2), respectively. As such, the multi-band envelope tracking circuit 60 is able to perform envelope tracking power amplification for any combination of the first RF signal 68, the second RF signal 70, the third RF signal 72, and the fourth RF signal 74. As a result, the multi-band envelope tracking circuit 60 can be configured to support uplink carrier aggregation, for example, while reducing power consumption and heat dissipation.

The switching circuitry 76 is also configured to receive a first configuration signal 86(1) and a second configuration signal 86(2) from the first RF transceiver 66(1) and the second RF transceiver 66(2), respectively. Accordingly, the switching circuitry 76 is configured to provide one or more of the first configuration signal 86(1) and the second configuration signal 86(2) to selected one or more of the first envelope tracking signal path 64(1) and the second envelope tracking signal path 64(2). In a non-limiting example, the switching circuitry 76 can be configured to provide the first configuration signal 86(1) to the first envelope tracking signal path 64(1) and/or the second envelope tracking signal path 64(2) along with the first envelope tracking signal 62(1). Similarly, the switching circuitry 76 can be configured to provide the second configuration signal 86(2) to the first envelope tracking signal path 64(1) and/or the second envelope tracking signal path 64(2) along with the second envelope tracking signal 62(2). The first configuration signal 86(1) and the second configuration signal 86(2) may include information for configuring the first envelope tracking signal path 64(1) and the second envelope tracking signal path 64(2), respectively. For example, the first configuration signal 86(1) can be used to configure the first lower-band RF amplifier 78 and the second higher-band RF amplifier 84 for amplifying the first RF signal 68 and the second RF signal 70, respectively. Likewise, the second configuration signal 86(2) can be used to configure the second lower-band RF amplifier 82 and the first higher-band RF amplifier 80 for amplifying the third RF signal 72 and the fourth RF signal 74, respectively.

The switching circuitry 76 includes a first multiplexing circuit 88. The first multiplexing circuit 88 is configured to receive the first configuration signal 86(1) and the second configuration signal 86(2) from the first RF transceiver 66(1) and the second RF transceiver 66(2), respectively. In a non-limiting example, the first RF transceiver 66(1) is configured to provide the first configuration signal 86(1) to the first multiplexing circuit 88 via a first RF front-end (RFFE) bus 90(1). Similarly, the second RF transceiver 66(2) is configured to provide the second configuration signal 86(2) to the first multiplexing circuit 88 via a second RFFE bus 90(2).

The first envelope tracking signal path 64(1) includes a first configuration circuit 92(1) communicatively coupled to the first multiplexing circuit 88 to receive the first configuration signal 86(1) or the second configuration signal 86(2). The second envelope tracking signal path 64(2) includes a second configuration circuit 92(2) communicatively coupled to the first multiplexing circuit 88 to receive the first configuration signal 86(1) or the second configuration signal 86(2). In this regard, the first configuration circuit 92(1) and the second configuration circuit 92(2) are RFFE slaves to the first RF transceiver 66(1) and the second RF transceiver 66(2), respectively.

The switching circuitry 76 also includes a second multiplexing circuit 94 configured to receive the first envelope tracking signal 62(1) and the second envelope tracking signal 62(2) from the first RF transceiver 66(1) and the second RF transceiver 66(2), respectively. Accordingly, the second multiplexing circuit 94 is configured to provide the one or more of the first envelope tracking signal 62(1) and the second envelope tracking signal 62(2) to selected one or more of the first envelope tracking signal path 64(1) and the second envelope tracking signal path 64(2).

The first envelope tracking signal path 64(1) includes a first control circuit 96(1) and a first switcher 98(1). The first control circuit 96(1) is communicatively coupled to the second multiplexing circuit 94 and the first configuration circuit 92(1). The first configuration circuit 92(1) is able to configure the first control circuit 96(1) based on the first configuration signal 86(1) or the second configuration signal 86(2). In a first non-limiting example, the first configuration circuit 92(1) can configure the first control circuit 96(1) to generate a first envelope tracking voltage supply signal 100(1) based on the first envelope tracking signal 62(1). In a second non-limiting example, the first configuration circuit 92(1) can configure the first control circuit 96(1) to generate the first envelope tracking voltage supply signal 100(1) based on the second envelope tracking signal 62(2).

The first switcher 98(1) is communicatively coupled to the first control circuit 96(1). The first switcher 98(1) is further coupled to the first lower-band RF amplifier 78 and the first higher-band RF amplifier 80. As such, the first switcher 98(1) controls the first lower-band RF amplifier 78 and the first higher-band RF amplifier 80 based on the first envelope tracking voltage supply signal 100(1). When the first control circuit 96(1) generates the first envelope tracking voltage supply signal 100(1) based on the first envelope tracking signal 62(1), the first switcher 98(1) controls the first lower-band RF amplifier 78 to amplify the first RF signal 68 in the first RF band. In contrast, when the first control circuit 96(1) generates the first envelope tracking voltage supply signal 100(1) based on the second envelope tracking signal 62(2), the first switcher 98(1) controls the first higher-band RF amplifier 80 to amplify the fourth RF signal 74 in the fourth RF band.

The second envelope tracking signal path 64(2) includes a second control circuit 96(2) and a second switcher 98(2). The second control circuit 96(2) is communicatively coupled to the second multiplexing circuit 94 and the second configuration circuit 92(2). The second configuration circuit 92(2) is able to configure the second control circuit 96(2) based on the first configuration signal 86(1) or the second configuration signal 86(2). In a first non-limiting example, the second configuration circuit 92(2) can configure the second control circuit 96(2) to generate a second envelope tracking voltage supply signal 100(2) based on the first envelope tracking signal 62(1). In a second non-limiting example, the second configuration circuit 92(2) can configure the second control circuit 96(2) to generate the second envelope tracking voltage supply signal 100(2) based on the second envelope tracking signal 62(2).

The second switcher 98(2) is communicatively coupled to the second control circuit 96(2). The second switcher 98(2) is further coupled to the second lower-band RF amplifier 82 and the second higher-band RF amplifier 84. As such, the second switcher 98(2) controls the second lower-band RF amplifier 82 and the second higher-band RF amplifier 84 based on the second envelope tracking voltage supply signal 100(2). When the second control circuit 96(2) generates the second envelope tracking voltage supply signal 100(2) based on the second envelope tracking signal 62(2), the second switcher 98(2) controls the second lower-band RF amplifier 82 to amplify the third RF signal 72 in the third RF band. In contrast, when the second control circuit 96(2) generates the second envelope tracking voltage supply signal 100(2) based on the first envelope tracking signal 62(1), the second switcher 98(2) controls the second higher-band RF amplifier 84 to amplify the second RF signal 70 in the second RF band The multi-band envelope tracking circuit 60 further includes a first APT circuit 102(1) and a second APT circuit 102(2). The first APT circuit 102(1) is communicatively coupled to the first configuration circuit 92(1), the first lower-band RF amplifier 78, and the first higher-band RF amplifier 80. In this regard, the first configuration circuit 92(1) may control the first APT circuit 102(1) to amplify the first RF signal 68 or the fourth RF signal 74 based on APT amplification. The second APT circuit 102(2) is communicatively coupled to the second configuration circuit 92(2), the second lower-band RF amplifier 82, and the second higher-band RF amplifier 84. In this regard, the second configuration circuit 92(2) may control the second APT circuit 102(2) to amplify the third RF signal 72 or the second RF signal 70 based on APT amplification.

The multi-band envelope tracking circuit 60 includes a controller 104 that is communicatively coupled to the first RF transceiver 66(1) and the second RF transceiver 66(2). In a non-limiting example, the controller 104 is configured to configure the switching circuitry 76 to provide the one or more of the first envelope tracking signal 62(1) and the second envelope tracking signal 62(2) to selected one or more of the first envelope tracking signal path 64(1) and the second envelope tracking signal path 64(2). In another non-limiting example, the controller 104 is configured to provide the one or more of the first configuration signal 86(1) and the second configuration signal 86(2) to selected one or more of the first envelope tracking signal path 64(1) and the second envelope tracking signal path 64(2).

Figure 5:
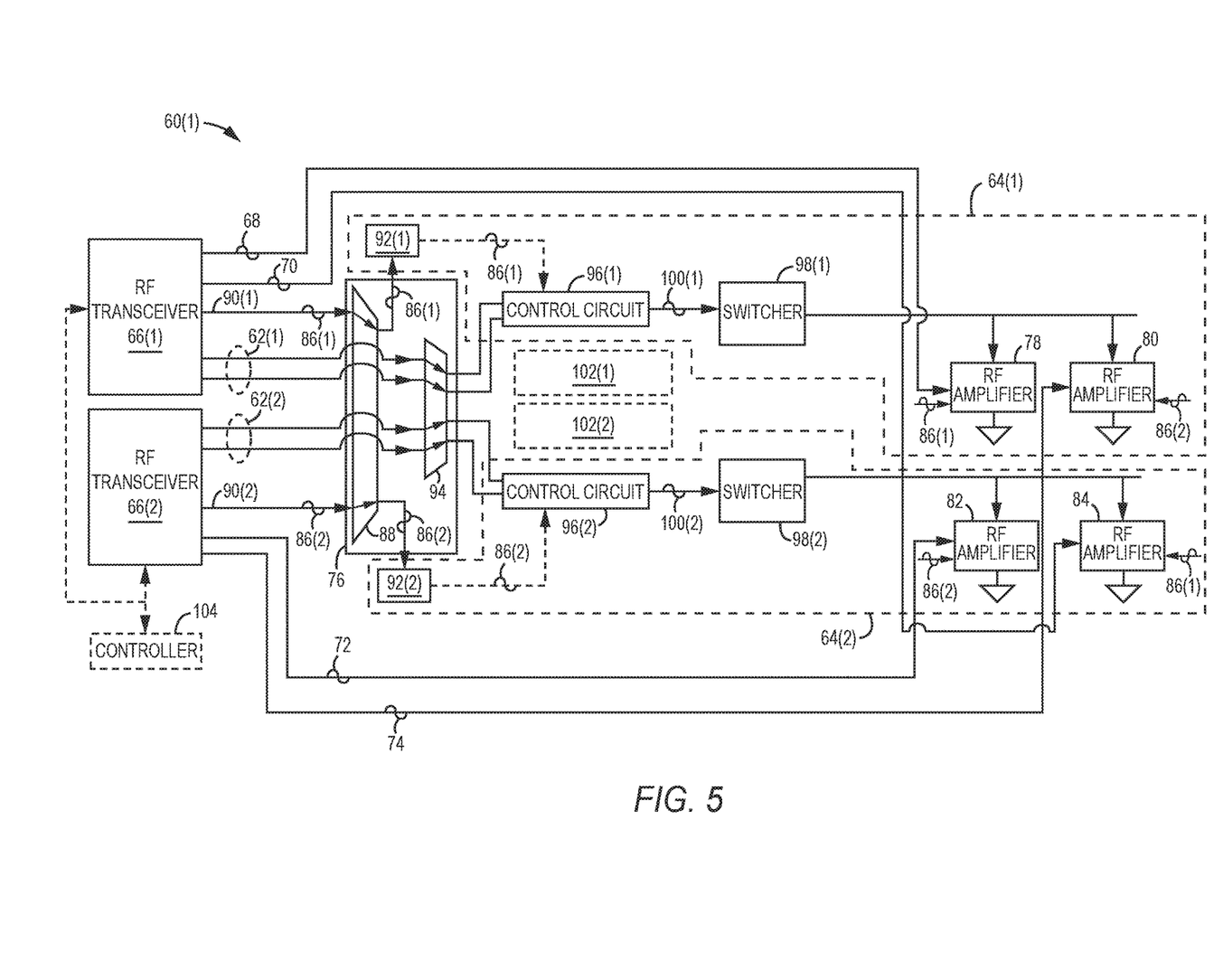
FIG. 5 is a schematic diagram of an exemplary multi-band envelope tracking circuit in which a switching circuitry is configured according to the first multiplexing configuration of FIG. 4A.

In a non-limiting example, the multi-band envelope tracking circuit 60 can be configured to amplify the first RF signal 68 in the first RF band and the third RF signal 72 in the third RF band concurrently. In this regard, FIG. 5 is a schematic diagram of an exemplary multi-band envelope tracking circuit 60(1) in which the switching circuitry 76 of FIG. 3 is configured according to the first multiplexing configuration of FIG. 4A. Common elements between FIGS. 3, 4A, and 5 are shown therein with common element numbers and will not be re-described herein.

The first multiplexing circuit 88 is configured to provide the first configuration signal 86(1) and the second configuration signal 86(2) to the first configuration circuit 92(1) and the second configuration circuit 92(2), respectively. The first configuration circuit 92(1) receives the first configuration signal 86(1) and configures the first control circuit 96(1) and the first lower-band RF amplifier 78 based on the first configuration signal 86(1). The first control circuit 96(1) is configured to receive the first envelope tracking signal 62(1) from the second multiplexing circuit 94. The first control circuit 96(1) generates the first envelope tracking voltage supply signal 100(1) based on the first envelope tracking signal 62(1). The first switcher 98(1) controls the first lower-band RF amplifier 78 to amplify the first RF signal 68 in the first RF band based on the first envelope tracking voltage supply signal 100(1).

The second configuration circuit 92(2) receives the second configuration signal 86(2) and configures the second control circuit 96(2) and the second lower-band RF amplifier 82 based on the second configuration signal 86(2). The second control circuit 96(2) is configured to receive the second envelope tracking signal 62(2) from the second multiplexing circuit 94. The second control circuit 96(2) generates the second envelope tracking voltage supply signal 100(2) based on the second envelope tracking signal 62(2). The second switcher 98(2) controls the second lower-band RF amplifier 82 to amplify the third RF signal 72 in the third RF band based on the second envelope tracking voltage supply signal 100(2). In this regard, the multi-band envelope tracking circuit 60(1) is configured to amplify the first RF signal 68 and the third RF signal 72 concurrently.

Figure 6:
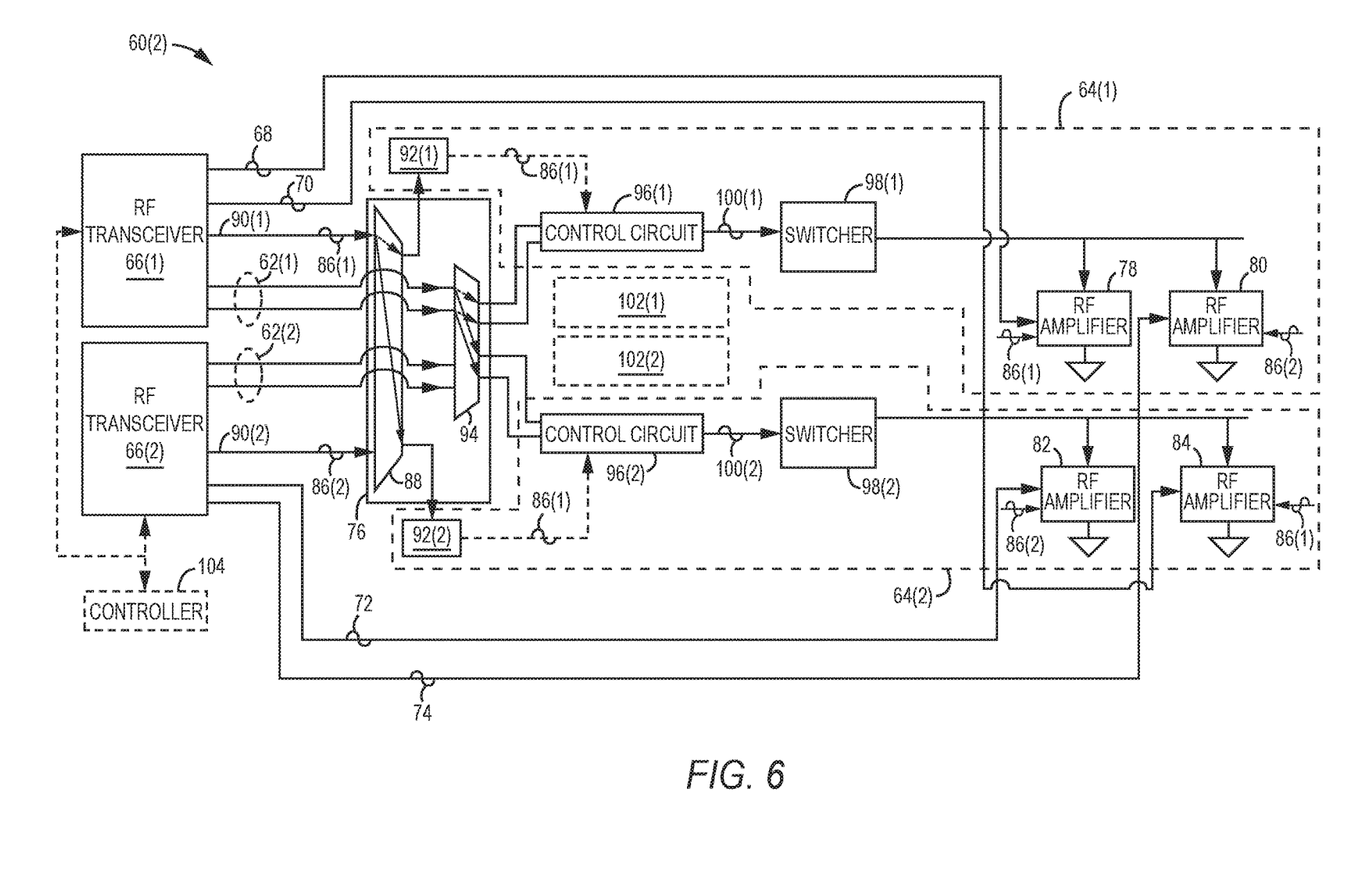
FIG. 6 is a schematic diagram of an exemplary multi-band envelope tracking circuit in which a switching circuitry is configured according to the second multiplexing configuration of FIG. 4B.

In another non-limiting example, the multi-band envelope tracking circuit 60 of FIG. 3 can be configured to amplify the second RF signal 70 in the second RF band. In this regard, FIG. 6 is a schematic diagram of an exemplary multi-band envelope tracking circuit 60(2) in which the switching circuitry 76 of FIG. 3 is configured according to the second multiplexing configuration of FIG. 4B. Common elements between FIGS. 3, 4B, and 6 are shown therein with common element numbers and will not be re-described herein.

With reference to FIG. 6, the first multiplexing circuit 88 is configured to provide the first configuration signal 86(1) to the second configuration circuit 92(2). The second configuration circuit 92(2) receives the first configuration signal 86(1) and configures the second control circuit 96(2) and the second higher-band RF amplifier 84 based on the first configuration signal 86(1). The second control circuit 96(2) is configured to receive the first envelope tracking signal 62(1) from the second multiplexing circuit 94. The second control circuit 96(2) generates the second envelope tracking voltage supply signal 100(2) based on the first envelope tracking signal 62(1). The second switcher 98(2) controls the second higher-band RF amplifier 84 to amplify the second RF signal 70 in the second RF band based on the second envelope tracking voltage supply signal 100(2).

The first multiplexing circuit 88 may be configured to also provide the first configuration signal 86(1) to the first configuration circuit 92(1). The first configuration circuit 92(1) receives the first configuration signal 86(1) and configures the first control circuit 96(1) and the first lower-band RF amplifier 78 based on the first configuration signal 86(1). The first control circuit 96(1) is configured to receive the first envelope tracking signal 62(1) from the second multiplexing circuit 94. The first control circuit 96(1) generates the first envelope tracking voltage supply signal 100(1) based on the first envelope tracking signal 62(1). The first switcher 98(1) controls the first lower-band RF amplifier 78 to amplify the first RF signal 68 in the first RF band based on the first envelope tracking voltage supply signal 100(1). In this regard, the multi-band envelope tracking circuit 60(2) is configured to amplify the first RF signal 68 and the second RF signal 70 concurrently.

Figure 7:
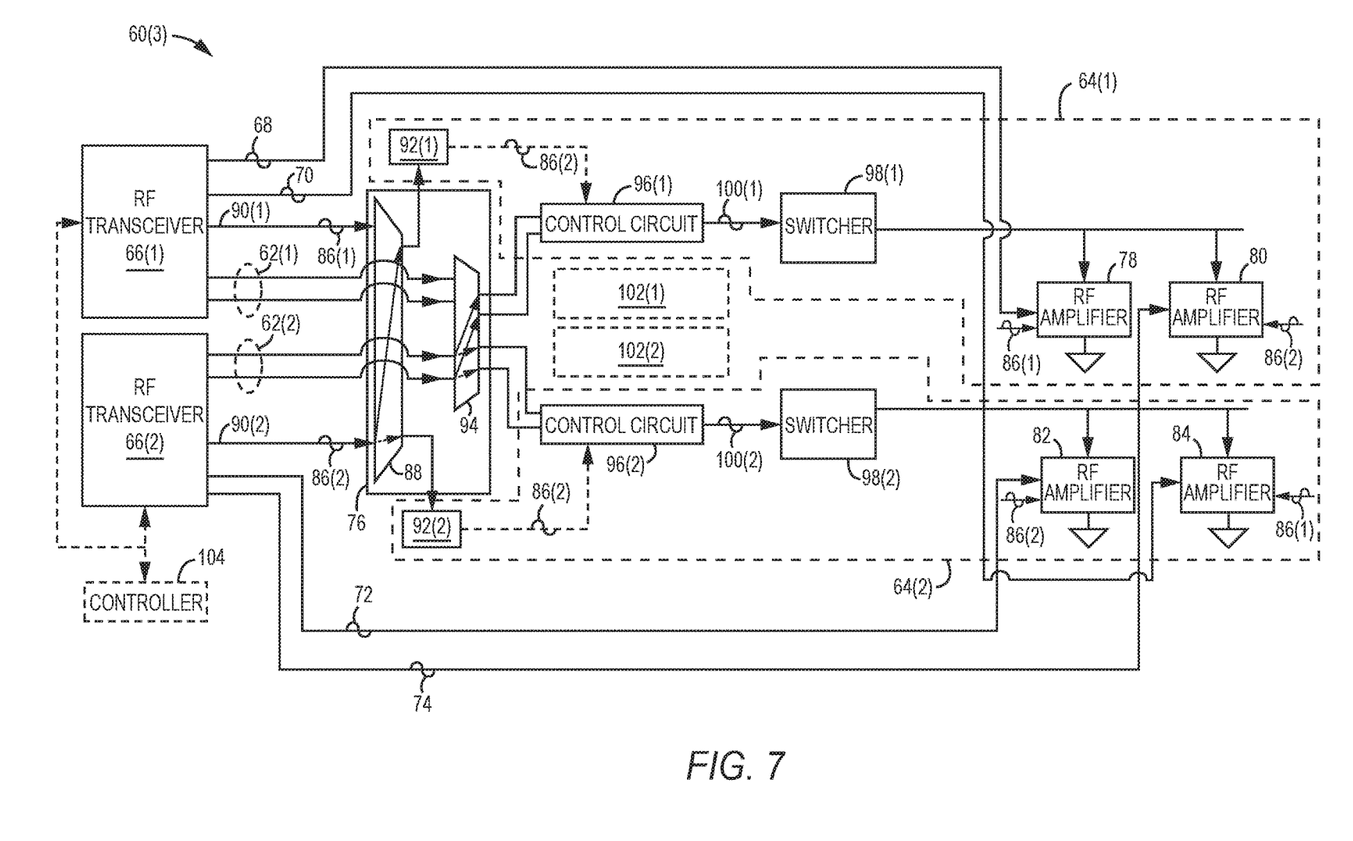
FIG. 7 is a schematic diagram of an exemplary multi-band envelope tracking circuit in which a switching circuitry is configured according to the third multiplexing configuration of FIG. 4C.

In another non-limiting example, the multi-band envelope tracking circuit 60 of FIG. 3 can be configured to amplify the fourth RF signal 74 in the fourth RF band. In this regard, FIG. 7 is a schematic diagram of an exemplary multi-band envelope tracking circuit 60(3) in which the switching circuitry 76 of FIG. 3 is configured according to the third multiplexing configuration of FIG. 4C. Common elements between FIGS. 3, 4C, and 7 are shown therein with common element numbers and will not be re-described herein.

With reference to FIG. 7, the first multiplexing circuit 88 is configured to provide the second configuration signal 86(2) to the first configuration circuit 92(1). The first configuration circuit 92(1) receives the second configuration signal 86(2) and configures the first control circuit 96(1) and the first higher-band RF amplifier 80 based on the second configuration signal 86(2). The first control circuit 96(1) is configured to receive the second envelope tracking signal 62(2) from the second multiplexing circuit 94. The first control circuit 96(1) generates the first envelope tracking voltage supply signal 100(1) based on the second envelope tracking signal 62(2). The first switcher 98(1) controls the first higher-band RF amplifier 80 to amplify the fourth RF signal 74 in the fourth RF band based on the first envelope tracking voltage supply signal 100(1).

The first multiplexing circuit 88 may be configured to also provide the second configuration signal 86(2) to the second configuration circuit 92(2). The second configuration circuit 92(2) receives the second configuration signal 86(2) and configures the second control circuit 96(2) and the second lower-band RF amplifier 82 based on the second configuration signal 86(2). The second control circuit 96(2) is configured to receive the second envelope tracking signal 62(2) from the second multiplexing circuit 94. The second control circuit 96(2) generates the second envelope tracking voltage supply signal 100(2) based on the second envelope tracking signal 62(2). The second switcher 98(2) controls the second lower-band RF amplifier 82 to amplify the third RF signal 72 in the third RF band based on the second envelope tracking voltage supply signal 100(2). In this regard, the multi-band envelope tracking circuit 60(3) is configured to amplify the third RF signal 72 and the fourth RF signal 74 concurrently.

Figure 8:
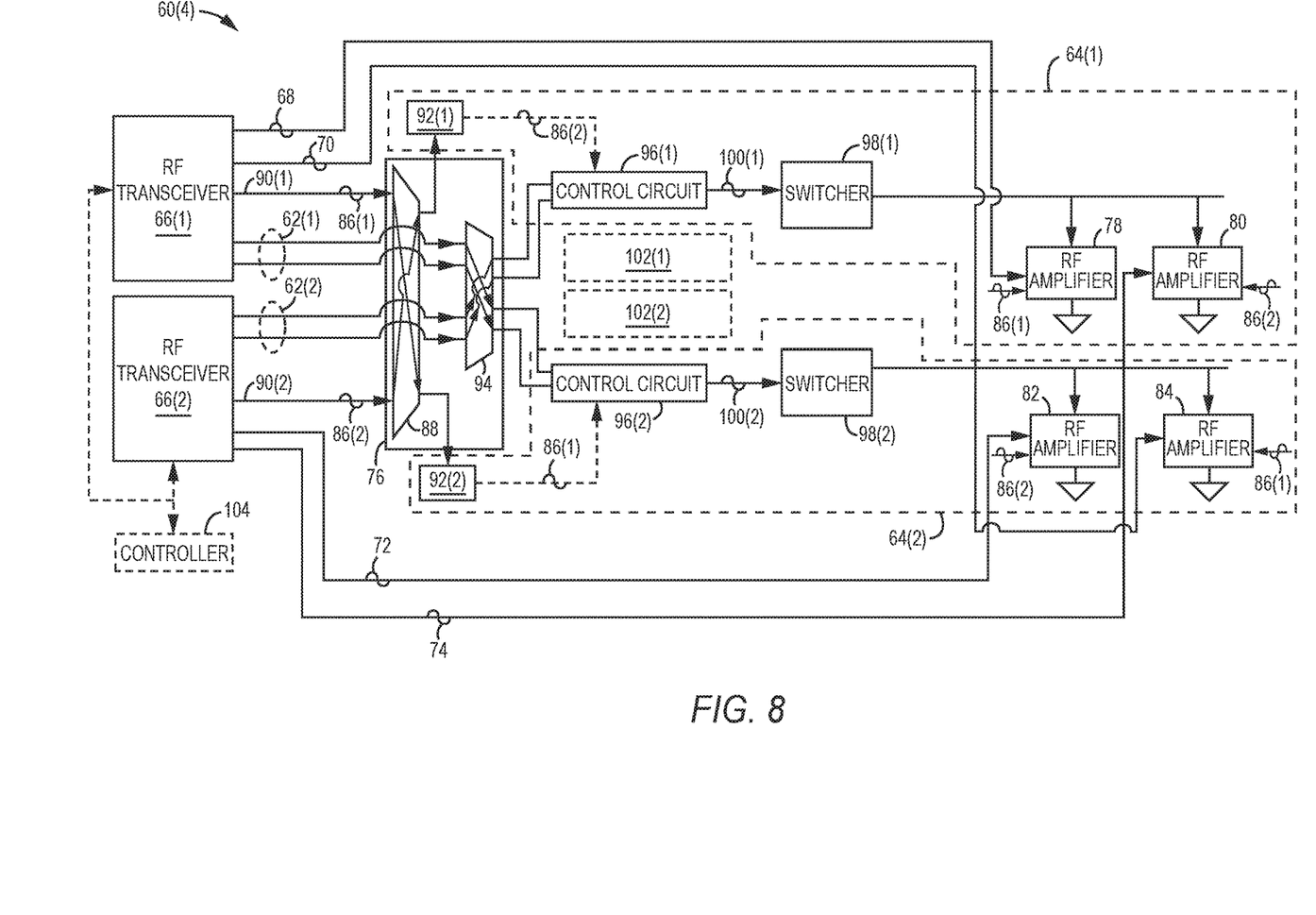
FIG. 8 is a schematic diagram of an exemplary multi-band envelope tracking circuit in which a switching circuitry is configured according to the fourth multiplexing configuration of FIG. 4D.

In another non-limiting example, the multi-band envelope tracking circuit 60 of FIG. 3 can be configured to amplify the second RF signal 70 in the second RF band and the fourth RF signal 74 in the fourth RF band concurrently. In this regard, FIG. 8 is a schematic diagram of an exemplary multi-band envelope tracking circuit 60(4) in which the switching circuitry 76 of FIG. 3 is configured according to the fourth multiplexing configuration of FIG. 4D. Common elements between FIGS. 3, 4D, and 8 are shown therein with common element numbers and will not be re-described herein.

With reference to FIG. 8, the first multiplexing circuit 88 is configured to provide the first configuration signal 86(1) and the second configuration signal 86(2) to the second configuration circuit 92(2) and the first configuration circuit 92(1), respectively. The first configuration circuit 92(1) receives the second configuration signal 86(2) and configures the first control circuit 96(1) and the first higher-band RF amplifier 80 based on the second configuration signal 86(2). The first control circuit 96(1) is configured to receive the second envelope tracking signal 62(2) from the second multiplexing circuit 94. The first control circuit 96(1) generates the first envelope tracking voltage supply signal 100(1) based on the second envelope tracking signal 62(2). The first switcher 98(1) controls the first higher-band RF amplifier 80 to amplify the fourth RF signal 74 in the fourth RF band based on the first envelope tracking voltage supply signal 100(1).

The second configuration circuit 92(2) receives the first configuration signal 86(1) and configures the second control circuit 96(2) and the second higher-band RF amplifier 84 based on the first configuration signal 86(1). The second control circuit 96(2) is configured to receive the first envelope tracking signal 62(1) from the second multiplexing circuit 94. The second control circuit 96(2) generates the second envelope tracking voltage supply signal 100(2) based on the first envelope tracking signal 62(1). The second switcher 98(2) controls the second higher-band RF amplifier 84 to amplify the second RF signal 70 in the second RF band based on the second envelope tracking voltage supply signal 100(2). In this regard, the multi-band envelope tracking circuit 60(4) is configured to amplify the second RF signal 70 and the fourth RF signal 74 concurrently.

With reference back to FIG. 3, in a non-limiting example, the first RF signal 68 and the second RF signal 70 are included in at least one first RF communication signal 106(1). In this regard, the first RF transceiver 66(1) is configured to communicate the first RF communication signal 106(1) in one or more first RF communication bands including at least the first RF band and the second RF band. In the same non-limiting example, the third RF signal 72 and the fourth RF signal 74 are included in at least one second RF communication signal 106(2). In this regard, the second RF transceiver 66(2) is configured to communicate the second RF communication signal 106(2) in one or more second RF communication bands including at least the third RF band and the fourth RF band.

Accordingly, the first envelope tracking signal path 64(1) is configured to amplify the first RF communication signal 106(1) in at least one of the first RF communication bands based on the first envelope tracking signal 62(1). The first envelope tracking signal path 64(1) is also configured to amplify the second RF communication signal 106(2) in at least one of the second RF communication bands based on the second envelope tracking signal 62(2). Similarly, the second envelope tracking signal path 64(2) is configured to amplify the first RF communication signal 106(1) in the at least one of the first RF communication bands based on the first envelope tracking signal 62(1). The second envelope tracking signal path 64(2) is also configured to amplify the second RF communication signal 106(2) in the at least one of the second RF communication bands based on the second envelope tracking signal 62(2).

Those skilled in the art will recognize improvements and modifications to the embodiments of the present disclosure. All such improvements and modifications are considered within the scope of the concepts disclosed herein and the claims that follow.

What is claimed is:

1. A multi-band envelope tracking circuit, comprising:
   a first radio frequency (RF) transceiver configured to communicate a first RF signal in a first RF band and a second RF signal in a second RF band;
   a second RF transceiver configured to communicate a third RF signal in a third RF band and a fourth RF signal in a fourth RF band;
   a first envelope tracking signal path configured to:
      amplify the first RF signal in the first RF band based on at least one first envelope tracking signal; and
      amplify the fourth RF signal in the fourth RF band based on at least one second envelope tracking signal;
   a second envelope tracking signal path configured to:
      amplify the second RF signal in the second RF band based on the at least one first envelope tracking signal; and
      amplify the third RF signal in the third RF band based on the at least one second envelope tracking signal; and
   switching circuitry coupled to the first RF transceiver, the second RF transceiver, the first envelope tracking signal path, and the second envelope tracking signal path, wherein the switching circuitry is configured to:
      receive the at least one first envelope tracking signal and the at least one second envelope tracking signal from the first RF transceiver and the second RF transceiver, respectively; and
      provide one or more of the at least one first envelope tracking signal and the at least one second envelope tracking signal to selected one or more of the first envelope tracking signal path and the second envelope tracking signal path.

2. The multi-band envelope tracking circuit of claim 1, wherein the switching circuitry is further configured to:
   receive a first configuration signal and a second configuration signal from the first RF transceiver and the second RF transceiver, respectively; and
   provide one or more of the first configuration signal and the second configuration signal to the selected one or more of the first envelope tracking signal path and the second envelope tracking signal path.

3. The multi-band envelope tracking circuit of claim 2, wherein the switching circuitry comprises:
   a first multiplexing circuit configured to receive the first configuration signal and the second configuration signal from the first RF transceiver and the second RF transceiver, respectively; and
   a second multiplexing circuit configured to receive the at least one first envelope tracking signal and the at least one second envelope tracking signal from the first RF transceiver and the second RF transceiver, respectively.

4. The multi-band envelope tracking circuit of claim 3, wherein:
   the first multiplexing circuit is further configured to provide the first configuration signal and the second configuration signal to the first envelope tracking signal path and the second envelope tracking signal path, respectively; and
   the second multiplexing circuit is further configured to provide the at least one first envelope tracking signal and the at least one second envelope tracking signal to the first envelope tracking signal path and the second envelope tracking signal path, respectively.

5. The multi-band envelope tracking circuit of claim 3, wherein:
   the first multiplexing circuit is further configured to provide the first configuration signal to the second envelope tracking signal path; and
   the second multiplexing circuit is further configured to provide the at least one first envelope tracking signal to the second envelope tracking signal path.

6. The multi-band envelope tracking circuit of claim 3, wherein:
   the first multiplexing circuit is further configured to provide the second configuration signal to the first envelope tracking signal path; and
   the second multiplexing circuit is further configured to provide the at least one second envelope tracking signal to the first envelope tracking signal path.

7. The multi-band envelope tracking circuit of claim 3, wherein:
   the first multiplexing circuit is further configured to provide the first configuration signal and the second configuration signal to the second envelope tracking signal path and the first envelope tracking signal path, respectively; and
   the second multiplexing circuit is further configured to provide the at least one first envelope tracking signal and the at least one second envelope tracking signal to the second envelope tracking signal path and the first envelope tracking signal path, respectively.

8. The multi-band envelope tracking circuit of claim 3, wherein:
   the first RF transceiver is further configured to provide the first configuration signal to the first multiplexing circuit via a first RF front-end (RFFE) bus; and
   the second RF transceiver is further configured to provide the second configuration signal to the first multiplexing circuit via a second RFFE bus.

9. The multi-band envelope tracking circuit of claim 3, wherein:

the first envelope tracking signal path comprises:
  a first configuration circuit communicatively coupled to the first multiplexing circuit;
  a first control circuit communicatively coupled to the second multiplexing circuit and the first configuration circuit;
  a first switcher communicatively coupled to the first control circuit;
  a first lower-band RF amplifier coupled to the first switcher; and
  a first higher-band RF amplifier coupled to the first switcher; and
the second envelope tracking signal path comprises:
  a second configuration circuit communicatively coupled to the first multiplexing circuit;
  a second control circuit communicatively coupled to the second multiplexing circuit and the second configuration circuit;
  a second switcher communicatively coupled to the second control circuit;
  a second lower-band RF amplifier coupled to the second switcher; and
  a second higher-band RF amplifier coupled to the second switcher.

10. The multi-band envelope tracking circuit of claim 9, further comprising:
  a first average power tracking (APT) circuit communicatively coupled to the first configuration circuit, the first lower-band RF amplifier, and the first higher-band RF amplifier; and
  a second APT circuit communicatively coupled to the second configuration circuit, the second lower-band RF amplifier, and the second higher-band RF amplifier.

11. The multi-band envelope tracking circuit of claim 9, wherein:
  the first configuration circuit is configured to:
    receive the first configuration signal from the first multiplexing circuit; and
    configure the first control circuit and the first lower-band RF amplifier based on the first configuration signal;
  the first control circuit is configured to receive the at least one first envelope tracking signal from the second multiplexing circuit and generate a first envelope tracking voltage supply signal based on the at least one first envelope tracking signal;
  the first switcher is configured to control the first lower-band RF amplifier to amplify the first RF signal in the first RF band based on the first envelope tracking voltage supply signal;
  the second configuration circuit is configured to:
    receive the second configuration signal from the first multiplexing circuit; and
    configure the second control circuit and the second lower-band RF amplifier based on the second configuration signal;
  the second control circuit is configured to receive the at least one second envelope tracking signal from the second multiplexing circuit and generate a second envelope tracking voltage supply signal based on the at least one second envelope tracking signal; and
  the second switcher is configured to control the second lower-band RF amplifier to amplify the third RF signal in the third RF band based on the second envelope tracking voltage supply signal.

12. The multi-band envelope tracking circuit of claim 9, wherein:
  the second configuration circuit is configured to:
    receive the first configuration signal from the first multiplexing circuit; and
    configure the second control circuit and the second higher-band RF amplifier based on the first configuration signal;
  the second control circuit is configured to receive the at least one first envelope tracking signal from the second multiplexing circuit and generate a second envelope tracking voltage supply signal based on the at least one first envelope tracking signal; and
  the second switcher is configured to control the second higher-band RF amplifier to amplify the second RF signal in the second RF band based on the second envelope tracking voltage supply signal.

13. The multi-band envelope tracking circuit of claim 12, wherein:
  the first configuration circuit is configured to:
    receive the first configuration signal from the first multiplexing circuit; and
    configure the first control circuit and the first lower-band RF amplifier based on the first configuration signal;
  the first control circuit is configured to receive the at least one first envelope tracking signal from the second multiplexing circuit and generate a first envelope tracking voltage supply signal based on the at least one first envelope tracking signal; and
  the first switcher is configured to control the first lower-band RF amplifier to amplify the first RF signal in the first RF band based on the first envelope tracking voltage supply signal.

14. The multi-band envelope tracking circuit of claim 9, wherein:
  the first configuration circuit is configured to:
    receive the second configuration signal from the first multiplexing circuit; and
    configure the first control circuit and the first higher-band RF amplifier based on the second configuration signal;
  the first control circuit is configured to receive the at least one second envelope tracking signal from the second multiplexing circuit and generate a first envelope tracking voltage supply signal based on the at least one second envelope tracking signal; and
  the first switcher is configured to control the first higher-band RF amplifier to amplify the fourth RF signal in the fourth RF band based on the first envelope tracking voltage supply signal.

15. The multi-band envelope tracking circuit of claim 14, wherein:
  the second configuration circuit is configured to:
    receive the second configuration signal from the first multiplexing circuit; and
    configure the second control circuit and the second lower-band RF amplifier based on the second configuration signal;
  the second control circuit is configured to receive the at least one second envelope tracking signal from the second multiplexing circuit and generate a second envelope tracking voltage supply signal based on the at least one second envelope tracking signal; and
  the second switcher is configured to control the second lower-band RF amplifier to amplify the third RF signal in the third RF band based on the second envelope tracking voltage supply signal.

16. The multi-band envelope tracking circuit of claim 9, wherein:
the first configuration circuit is configured to:
receive the second configuration signal from the first multiplexing circuit; and
configure the first control circuit and the first higher-band RF amplifier based on the second configuration signal;
the first control circuit is configured to receive the at least one second envelope tracking signal from the second multiplexing circuit and generate a first envelope tracking voltage supply signal based on the at least one second envelope tracking signal;
the first switcher is configured to control the first higher-band RF amplifier to amplify the fourth RF signal in the fourth RF band based on the first envelope tracking voltage supply signal;
the second configuration circuit is configured to:
receive the first configuration signal from the first multiplexing circuit; and
configure the second control circuit and the second higher-band RF amplifier based on the first configuration signal;
the second control circuit is configured to receive the at least one first envelope tracking signal from the second multiplexing circuit and generate a second envelope tracking voltage supply signal based on the at least one first envelope tracking signal; and
the second switcher is configured to control the second higher-band RF amplifier to amplify the second RF signal in the second RF band based on the second envelope tracking voltage supply signal.

17. The multi-band envelope tracking circuit of claim 2, further comprising a controller communicatively coupled to the first RF transceiver and the second RF transceiver.

18. The multi-band envelope tracking circuit of claim 17, wherein the controller is configured to configure the switching circuitry to provide the one or more of the at least one first envelope tracking signal and the at least one second envelope tracking signal to the selected one or more of the first envelope tracking signal path and the second envelope tracking signal path.

19. The multi-band envelope tracking circuit of claim 18, wherein the controller is further configured to provide the one or more of the first configuration signal and the second configuration signal to the selected one or more of the first envelope tracking signal path and the second envelope tracking signal path.

20. A multi-band envelope tracking circuit, comprising:
a first radio frequency (RF) transceiver configured to communicate at least one first RF communication signal in one or more first RF communication bands;
a second RF transceiver configured to communicate at least one second RF communication signal in one or more second RF communication bands;
a first envelope tracking signal path configured to:
amplify the at least one first RF communication signal in at least one of the one or more first RF communication bands based on at least one first envelope tracking signal; and
amplify the at least one second RF communication signal in at least one of the one or more second RF communication bands based on at least one second envelope tracking signal;
a second envelope tracking signal path configured to:
amplify the at least one first RF communication signal in the at least one of the one or more first RF communication bands based on the at least one first envelope tracking signal; and
amplify the at least one second RF communication signal in the at least one of the one or more second RF communication bands based on the at least one second envelope tracking signal; and
switching circuitry coupled to the first RF transceiver, the second RF transceiver, the first envelope tracking signal path, and the second envelope tracking signal path, wherein the switching circuitry is configured to:
receive the at least one first envelope tracking signal and the at least one second envelope tracking signal from the first RF transceiver and the second RF transceiver, respectively; and
provide one or more of the at least one first envelope tracking signal and the at least one second envelope tracking signal to selected one or more of the first envelope tracking signal path and the second envelope tracking signal path.

* * * * *